May 5, 1931.  O. U. ZERK  1,803,520
LUBRICATING APPARATUS
Filed Jan. 3, 1924
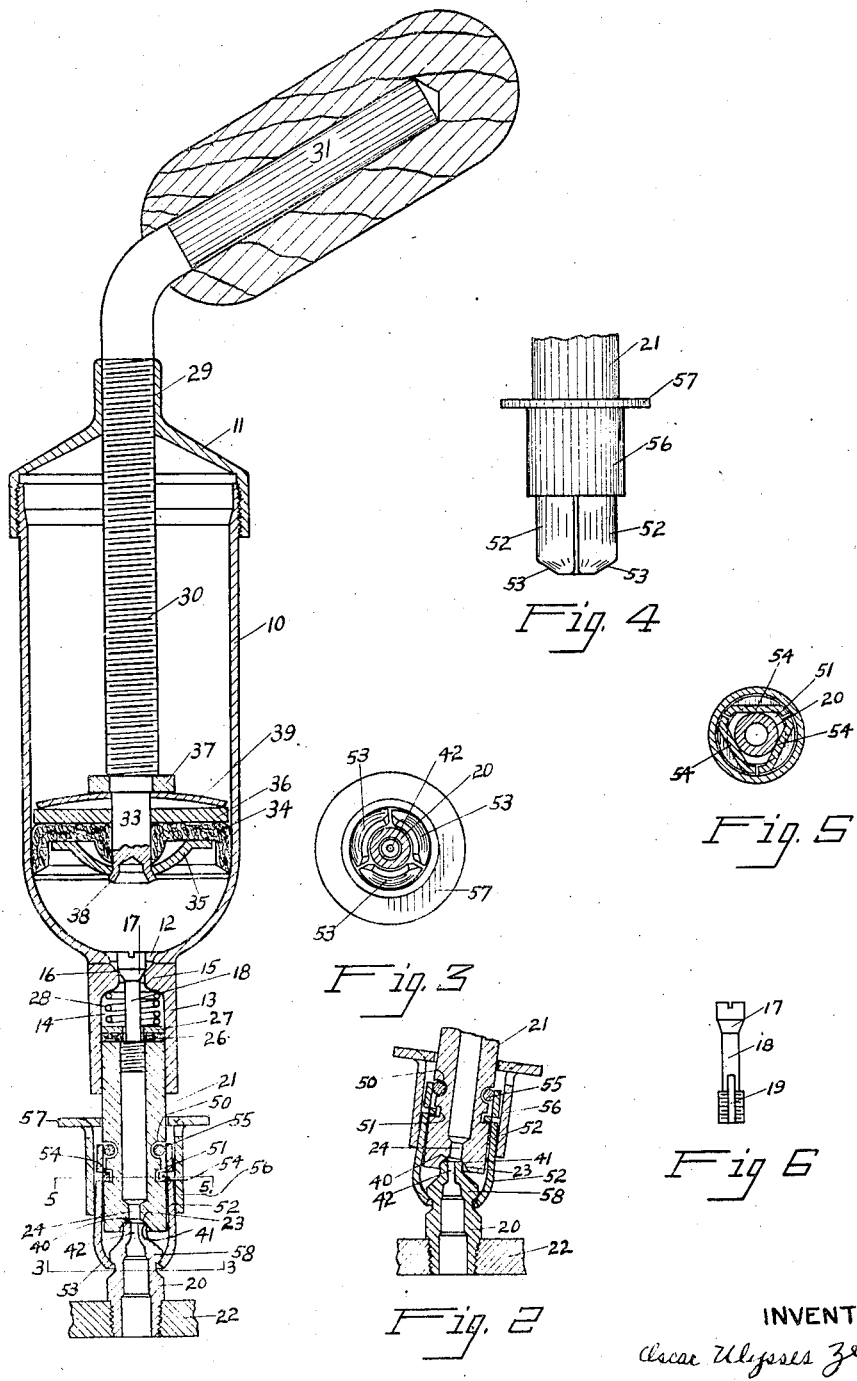
INVENTOR
Oscar Ulysses Zerk
BY
Richey, Slough and Watts.
ATTORNEYS Patented May 5, 1931

1,803,520

UNITED STATES PATENT OFFICE

OSCAR ULYSSES ZERK, OF CLEVELAND, OHIO, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed January 3, 1924. Serial No. 684,171.

My invention relates to improvements in lubricating apparatus.

An object of my invention is to provide a lubricating system in which a lubricating apparatus is provided with a contact face which will form a leakproof contact by direct engagement with a contact face of a nipple from any one of a plurality of directions and the provision of releasable means for securing such faces in contact.

Another object of my invention is to provide a lubricating system in which a lubricating apparatus is provided with an outlet contact face which when held in engagement against the inlet contact face of a nipple will form a leakproof swivelling connection, releasable means being provided to secure said faces in leakproof contact, such means permitting the contact face of the apparatus to swivel against the nipple face while the faces are secured together.

The invention further resides and consists in the arrangement and combination of parts hereinafter described and claimed, reference being had to the accompanying drawing wherein:—

Figure 1 is a medial sectional view of my invention showing the lubricating apparatus secured in contact with a nipple; Figure 2 is a similar view of the nozzle end in contact with the nipple showing the swivelling relation of the contact faces; Figure 3 is a sectional view taken on line 3—3 of Figure 1; Figure 4 is a fragmentary side elevational view of the end nozzle showing the clamp for securing the nozzle to the nipple; Figure 5 is a section of the nozzle taken on line 5—5 of Figure 1; and Figure 6 is a side elevational view of the valve within the apparatus.

Referring to the drawing, in which like characters represent like parts. the lubricant containing receptacle may be formed in various well-known ways. In my preferred embodiment, however, the receptacle consists of a short cylindrical barrel 10, one end of which is open and threaded exteriorally to receive the short closure cap 11, and the other end of which terminates in a restricted lubricant exit 12, to which a rigid cylindrical lubricant outlet nozzle 13 is rigidly secured by welding or other suitable means. The receptacle may be filled with lubricant when the cap 11 is unscrewed from the open end of the barrel in the usual manner.

The rigid nozzle extends centrally and longitudinally from the outlet end of the barrel, and is provided with a central passage 14 extending therethrough which is in communication with the lubricant exit 12, of the barrel. The inner end of the passage is restricted by a circular shoulder 15, the inner wall of which curves inwardly, and upwardly, forming a smooth junction with the curved inner wall of the lubricant exit 12, and providing a knife edge valve seat 16. The continuous curve thus formed within the receptacle, between the barrel and the valve seat, eliminates any corners or edges upon which lubricant can accumulate and permits the compressed lubricant to flush the valve seat of dirt and grit, insuring a leakproof closure. A valve member extends through the valve seat within the passage in the nozzle, and consists preferably of a cylindrical and tapered head 17, which terminates in a stem 18. The stem is enlarged at its lower end and is threaded exteriorly. A longitudinally extending slot 19 is formed in the valve stem and its threaded end, and curves inwardly from the wall of the stem and substantially centrally through the threaded end thereof. The tapered portion of the head of the valve member extends into and forms a closure for the restricted portion of the passage in the nozzle, when it is seated against the circular knife edge of the valve seat.

A lubricant dispensing connector 21 having a passage extending axially therethrough is mounted to be reciprocated within the outer cylindrical end of the nozzle, and forms the contacting portion of the nozzle which engages with the nipple 20 which is attached to a bearing element 22 in any suitable manner. The outer end of the connector projecting from the nozzle portion 13 is provided with a recessed spherical face 23 which is provided with a central opening 24. The end of the connector which slides within the hollow nozzle element 13 is threaded internally and receives the threaded head 19 of the valve stem forming an integral unit therewith.

A lubricant-proof leather washer 26 provided with a central aperture, through which the valve stem extends, is seated upon the inner end of the connector. A steel washer 27, provided with a central aperture through which the valve stem extends, rests upon the washer 26. A coil spring 28 is positioned between the shoulder 15 and the washer 27, within the passage in the nozzle to retain the lubricant-proof washer in contact with the connector, and also, to normally keep the valve member seated upon the valve seat. When the valve is open the lubricant passes from the barrel, through the valve seat, and into the passage in the nozzle in which the spring lies. The washer 26 is formed of a compressible material so that the compressed lubricant passing through the central aperture therein will expand the washer and provide a tight fit thereof, against the wall of the nozzle passage, to prevent lubricant from working down between the outer wall of the connector and the nozzle. When the valve is open, the compressed lubricant fills the passage in which the spring lies, and passes into the space between the washers and the valve member, and then, into the slot 19 which overlies the passage 23 through the connector.

The cap 11 is provided with an internally apertured threaded bearing nipple 29, which receives the threaded piston rod 30. The outer end 31, of the piston rod is bent at an obtuse angle, and knurled longitudinally to provide a handle for the pistol, and apertured grip is driven thereon. This angular handle provides a grip which can be firmly grasped in one hand, and further, will allow the user to exert a maximum direct pressure against the pistol while so held.

The inner end of the piston rod terminates in a cylindrical shank upon which the apertured leakproof piston 34 is reciprocably secured. A washer 35 extends below the piston upon the shank 33, and a washer 36 extends above the piston upon the shank 33. At the upper end of the shank is rigidly secured a stop 37, which with the upset end 38 of the piston rod, secures the piston upon the shank, and allows a limited sliding movement thereof.

Suitable resilient means are provided between the stop 37 on the piston rod and the reciprocable piston but in my preferred embodiment, I use a stiff concavo-convex, resilient sheet metal washer 39, which is apertured centrally to fit upon the shank. It will be understood that, while I have illustrated only one such washer, several superposed washers of this type could be used for the same purpose. Normally, the resilient washer retains the piston at the outer end of the shank, but the concavo-convex metal washer will flatten out as the piston slides up upon the shank, during each inward manual operation of the piston rod, when the outlet valve is closed. When the valve is opened the compressed spring will resume its normal position and move the piston to the end of the piston rod.

The nipple 20 is provided with a circular reduced inlet face 40 providing a circular contact edge 41 at its periphery. A passage 42 extends through the wall of the inlet face and preferably centrally thereof. The spherically shaped face of the nozzle end is of sufficient area to enclose the inlet end of the nipple, the spherical face when pressed against the circular peripheral edge of the nipple providing a leakproof joint while so maintained. The circular edge and the spherical face permits the gun to be swivelled against the nipple, after the faces are in contact, and will also allow the connection therebetween to be made when the gun is held in any one of a plurality of angular relations to the nipple, Fig. 1 showing the nozzle and nipple in axial alignment and Fig. 2 showing the nozzle at an angle to the nipple. The contact thus made will be leakproof as long as the passages 24 and 42 remain covered by the contact of the nipple edge 41 and the spherical face of the nozzle.

Pressure of the gun against the nipple when the contact faces are in engagement will move the connector 21 inwardly unseating the valve 17, and the prepressure created against the lubricant by the spring pressed piston will automatically force the lubricant through the nozzle as previously described and into the nipple from which it passes to the element to be lubricated. The lubricant can also be projected from the connector when the contact faces are in engagement and the valve opened by screwing the piston inwardly. It will be seen, however, that it is generally more desirable to compress the spring 34 previously to the application of the gun to the nipple, so that a charge will be injected and a leakproof contact made when the gun is pressed toward the nipple after placing the contact faces in desired operative position.

The nozzle element 21 of the gun is provided with circular grooves 50 and 51. A plurality of jaw arms 52 encircle the end of the nozzle and are provided with inwardly curving ends 53, and a pivot element 54 extending inwardly and seating in the groove 51. A circular coiled spring 55 is positioned within the groove 50 and exerts outward pressure against the ends of the jaws which extend thereover. A sleeve 56 is mounted around the jaws and is adapted to be reciprocated lengthwise thereon. The sleeve is provided with a flange 57 which extends outwardly affording a hand grip for the operator and inwardly of the sleeve so that it will engage the end of the nozzle 13 and the end of the jaws to limit the reciprocation thereof. The sleeve maintains the jaws in position upon the nozzle element and when moved toward the end of the nozzle 13 will permit the curved ends of the jaws to move outwardly. The nipple 20 is formed with an outwardly extending shoulder 58. The adjacent walls on each side thereof curving inwardly. The opening formed by the curved ends of the jaws is of sufficient diameter to pass over the contact face of the nipple, so that by pressing the gun toward the nipple the jaws will expand as they ride over the shoulder on the nipple The portions of the jaws extending beyond the nozzle element are of such length that the curved ends thereof will engage the shoulder of the nipple, when the contact face of the gun is in engagement with the nipple contact face. Normally the coil spring resists outward movement of the curved ends of the jaws so that, the jaws will engage the nipple shoulder when passed thereover. When the faces are in contact the sleeve is moved toward the curved ends of the jaws, securely clamping them over the shoulder of the nipple and securing the contacting faces in leakproof connection. When the jaws are so secured to the nipple the gun can be swivelled and still maintain the leakproof connection, the face 23 swivelling against the nipple face and the clamp jaws moving with the connector but remaining engaged over the shoulder on the nipple. The gun can be removed by sliding the sleeve toward the end of the nozzle 13, permitting the curved jaw ends to move over the nipple shoulder as the gun is withdrawn from the nipple.

It will be observed that the curved surfaces of the spherical seat 23 and the clamp jaws 53 are formed so that they have a common center, or coinciding radii when assembled together in operative contact. This arrangement permits the face 23 to swivel while maintaining a leak-proof contact with the inlet face of the nipple and allows the jaws to swivel upon the nipple shoulder thereby securing the face 23 in leak-proof contact with the nipple in any operative angular relation thereto.

Having thus described my invention I am aware that various departures may be made from the embodiment illustrated, described and referred to, but without departing from the spirit of my invention.

What I claim is:—

High pressure lubricating apparatus of the class described comprising, in combination, a lubricant receiving nipple having a flat topped circular inlet end, a concavely spherical lubricant delivering nozzle forming a lubricant tight metal to metal seal with said nipple when pressed thereagainst, said seal permitting universal movement of said nozzle about a fixed center, and quick detachable clamping means including pivoted jaws for maintaining said nipple and nozzle in lubricant tight engagement with each other and permitting universal movement of said nozzle about said center.

In testimony whereof I hereunto affix my signature this 29th day of December, 1923.

OSCAR ULYSSES ZERK.